(12) United States Patent
Cabaniss et al.

(10) Patent No.: US 7,796,268 B2
(45) Date of Patent: Sep. 14, 2010

(54) OPTICAL COMMUNICATIONS USING SPECTRAL INTERFEROMETRY

(75) Inventors: John Cabaniss, Marietta, GA (US); Tom Chaffee, Forked River, NJ (US)

(73) Assignee: Attochron, LLC, Forked River, NJ (US)

( * ) Notice: Subject to any disclaimer, the term of this patent is extended or adjusted under 35 U.S.C. 154(b) by 178 days.

(21) Appl. No.: 11/972,586

(22) Filed: Jan. 10, 2008

(65) Prior Publication Data

US 2009/0046293 A1    Feb. 19, 2009

Related U.S. Application Data

(60) Provisional application No. 60/879,722, filed on Jan. 10, 2007.

(51) Int. Cl.
  *G01B 9/02* (2006.01)
(52) U.S. Cl. .................... 356/451; 356/484

(58) Field of Classification Search ............. 156/477, 156/450, 451, 456, 484
See application file for complete search history.

(56) References Cited

U.S. PATENT DOCUMENTS

| | | | |
|---|---|---|---|
| 5,530,544 A | 6/1996 | Trebino et al. | |
| 6,504,612 B2 | 1/2003 | Trebino | |
| 6,956,653 B1 * | 10/2005 | Lam et al. | 356/477 |
| 2007/0070485 A1 | 3/2007 | Trebino | |

* cited by examiner

*Primary Examiner*—Hwa S. A Lee
(74) *Attorney, Agent, or Firm*—Mintz, Levin, Cohn, Ferris, Glovsky and Popeo, P.C.

(57) ABSTRACT

Optical communications can be performed using spectral interferometry. An incident transmission pulse or beam may be mixed with a locally generated beam or pulse to create an interference pattern that may be analyzed to extract the transmitted data. The incident transmission pulse or beam may also be split and mixed with itself to create an interference pattern.

20 Claims, 7 Drawing Sheets

OPTICAL COMMUNICATIONS USING SPECTRAL INTERFEROMETRY

CROSS-REFERENCE TO RELATED APPLICATIONS

This application claims the benefit of U.S. Provisional Patent Application Ser. No. 60/879,722, filed on Jan. 10, 2007 and entitled "Optical Communications Using Spectral Interferometry" which is incorporated by reference herein in its entirety.

FIELD

The subject matter described herein relates to optical communications.

BACKGROUND

Free space optical communications (FSOC) operate on a similar principle to fiber optics-based communications. Light propagating in free space can be used to transmit data between two points using a modulated light source. The technology can be useful in situations where the physical connection of the transmit and receive locations is difficult, for example in cities where laying of fiber optic cables can be expensive. FSOC can also be also used to communicate between space-craft, because outside of the atmosphere there is little to distort the signal. Current optical links typically use infrared laser light, although low-data-rate communication over short distances is possible using LEDs. Transmission distances up to the order of 10 km are possible with current technology, but the distance and data rate of these connections are highly dependent on atmospheric conditions.

When used in a vacuum, for example for inter-space craft communication, FSOC can provide similar performance to that of fiber-optic systems. However, for terrestrial applications, various factors, including beam dispersion and absorption in a non-vacuum atmosphere and scattering and/or absorption by particles such as rain, fog, snow, dust, aerosols due to pollution or natural processes, and the like can attenuate or otherwise degrade the quality of a received beam, thereby leading to a higher bit error ratio (BER) in the transmitted data. In some cases, atmospheric conditions like fog, clouds, or high aerosol concentrations can even completely break a connection. Current solutions to these issues include multi-beam or multi-path architectures that use more than one sender and more than one receiver. A larger "fade margin" or extra transmission power that is reserved for challenging atmospheric conditions such as rain, smog, fog, smoke, or the like, can also be used.

SUMMARY

In a first aspect, the current subject matter can include a method in which transmission light is received from a transmitter at a receiver. The transmission beam can carry optically encoded data from the transmitter. An interference pattern that includes a spatial distribution of light intensities formed from at least one constructive interference band and at least one destructive interference band is generated from the transmission light and projected onto a detector. The encoded data are reconstructed by analyzing the spatial distribution of light in the interference pattern and quantifying intensity differences between the at least one constructive interference band and the at least one destructive interference band.

In optional variations, the generating of the interference pattern can include splitting the transmission light and crossing the transmission light with itself. Alternatively, mixing light can optionally be emitted in the receiver and the interference pattern generated by crossing the transmission light and the mixing light. The mixing light can have a mixing wavelength and the transmission light a transmission wavelength. The detector can optionally be sensitive to light with at least one of the mixing wavelength and the transmission wavelength, or the detector can optionally be sensitive only to the mixing wavelength. The mixing light can optionally be emitted with a pulse width that depends on the difference between the transmission wavelength and the mixing wavelength. The mixing light can optionally have a mixing wavelength in the visible or near-visible region of the electromagnetic spectrum and the transmission light can optionally have a wavelength in the infrared region of the electromagnetic spectrum. The mixing light can optionally have a mixing wavelength in a range of approximately 700 to 900 nm or alternatively approximately 800 nm and the transmission light can optionally have a wavelength in a range of approximately 1450 to 1650 nm or alternatively approximately 1550 nm. The detector can optionally include a charge-coupled device or a recording camera. Reconstructing of the optically encoded data can in some variations optionally include capturing a screen shot from the detector and returning a digital "on" if an average of the intensity differences exceeds a threshold value and a digital "off" if the average intensity does not exceed the threshold value.

In an interrelated additional aspect, an optical communication apparatus includes a detector comprising a light sensitive measurement area, one or more optical components that direct incoming transmission light comprising optically encoded data transmitted from a transmitter unit such that the incoming transmission light forms an interference pattern that is projected onto the light sensitive measurement area, and a processor coupled to the detector. The interference pattern includes a spatial distribution of light intensities formed from at least one constructive interference band and at least one destructive interference band. The processor reconstructs the encoded data by analyzing the spatial distribution of light in the interference pattern and quantifying intensity differences between the at least one constructive interference band and the at least one destructive interference band.

In an additional interrelated aspect, an optical communication apparatus includes a detector that comprises a recording camera, a mixing laser source that produces mixing laser light at a mixing wavelength, one or more optical components that receive and direct incoming transmission laser light comprising optically encoded data transmitted from a transmitter unit such that the incoming transmission laser light is crossed with the mixing laser light to form an interference pattern that is projected onto the detector, and a processor coupled to the detector. The interference pattern includes a spatial distribution of light intensities formed from at least one constructive interference band and at least one destructive interference band. The processor captures a screenshot comprising the interference pattern from the detector and reconstructs the encoded data by analyzing the spatial distribution of light in the interference pattern, quantifies intensity differences between the at least one constructive interference band and the at least one destructive interference band, and returns a digital "on" if the average intensity exceeds a threshold value and a digital "off" if the average intensity does not exceed the threshold value.

The details of one or more variations of the subject matter described herein are set forth in the accompanying drawings and the description below. Other features and advantages of the subject matter described herein will be apparent from the description and drawings, and from the claims.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed embodiments. In the drawings.

DETAILED DESCRIPTION

Figure 1:
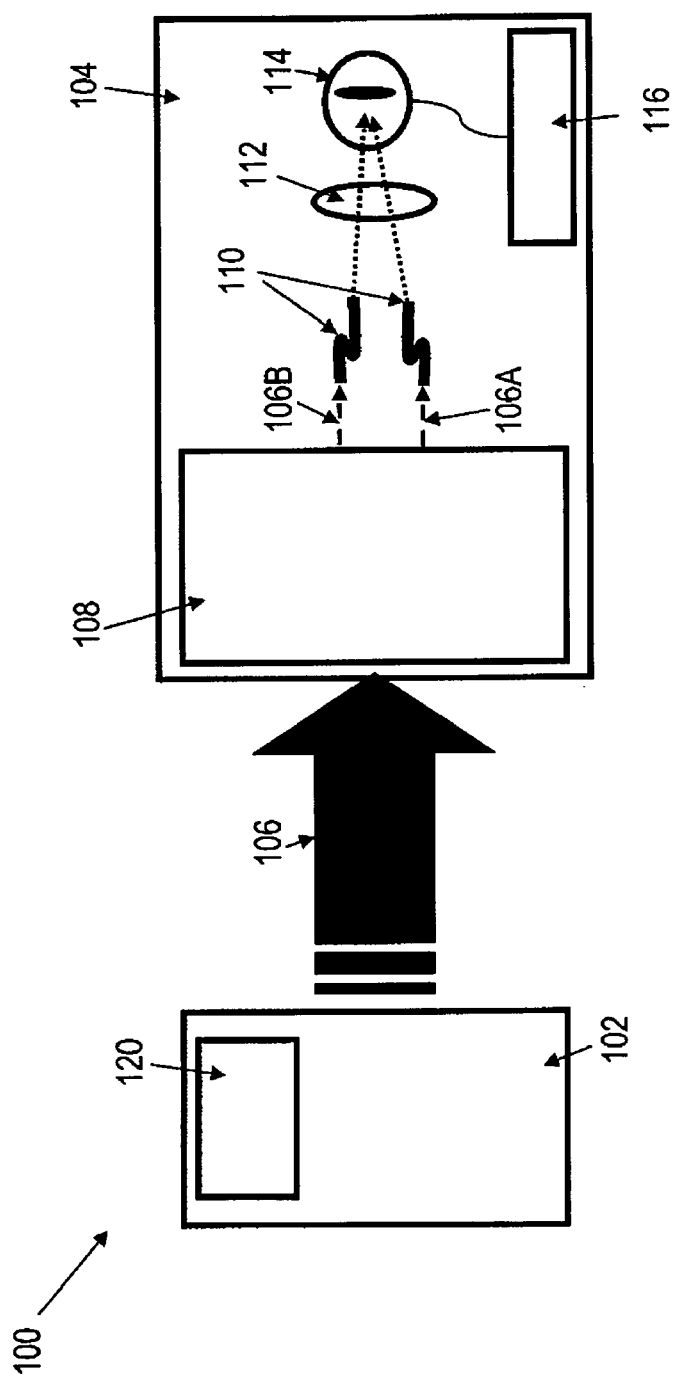
FIG. 1 is a diagram of a FSOC system in which an incident laser pulse is split and recombined to generate a spectral interference pattern.

The current subject matter includes methods, systems, devices, apparatuses, techniques, and article of manufacture that can provide an optical communication system incorporating interferometric, power to data management, and detector arrangements that can improve data transfer rates and reliability of FSOC communications systems. An optical communication systems in which data can be sent from a transmitter to a receiver using light as the transmitting medium is disclosed. In some implementations, the light can be a modulated laser beam. At the receiver, the beam can be used to produce a spectral interference pattern. Transmitted data are extracted from the interference pattern via an algorithm that samples the bands and peaks to identify and correct for noise and that benefits from improved sensitivity relative to receipt and decoding of a uniform power density trace.

An interferometric pattern can be created wherever light beams or pulses are crossed. The pattern results from the superimposition (interference) of two or more waves. In this manner, differences between the two or more crossed beams or pulses can be detected. Two waves with the same frequency that have the same phase will add to each other (constructive interference) while two waves with the same frequency that have opposite phase will subtract (destructive interference). Constructive and destructive interference can also be observed when two or more waves with differing frequencies are crossed. In an interferometer, a single light beam or pulse can be split into two (or more) coherent parts, which travel different paths, and the parts can then be combined to create interference. When the path lengths differ by an even number of half-wavelengths, the superposed waves are in phase and interfere constructively, increasing the amplitude of the output wave. When the path lengths differ by an odd number of half-wavelengths, the combined waves are 180° out of phase and interfere destructively, decreasing the amplitude of the output. Thus anything that changes the phase of one of the beams by only 180°, shifts the interference from a maximum to a minimum. This makes interferometry a sensitive measuring technique for changes or differences in the phase of a wave, such as path length or refractive index.

The fringes created at the crossing of two or more beams or pulses of light can have certain properties dependent upon characteristics of the light. If the two or more beams or pulses are of the same wavelength, then the fringe spacing is generally equidistant and proportional to the wavelength times the angle at which the two beam cross. The two light sources can in some implementations be laser pulses or beams or the like.

In any given measurement, a trace of equal net intensity can be more accurately measured with interferometric fringes. This is a power distribution issue, as a nominal measurement trace has even power throughout the image. Interferometric traces, however, contain unequal power distributions. For an interference pattern between two beams of light at the same wavelength, the interference pattern contains constructive interference peaks of twice the incident intensity and destructive interference troughs of zero intensity. Thus, creating an interference pattern and measuring the constructive peaks can in some implementations yield a factor of two gain in sensitivity relative to measuring the incident radiation directly.

An interference pattern such as described above can be focused tightly onto a camera surface to accurately resolve the pattern. Concentrating most of the power on a small area can facilitate easier detection and quantification of the features of the interference pattern from which the transmitted data can be more readily extracted. In free space optical communications, the phase of the transmitted light can be randomly altered as it passes through air. Focusing an interference pattern created by light with a finite degree of incoherence may lead to at least partial destructive interference. As such, while use of focusing elements is possible and within the scope of the currently disclosed subject matter, over-focusing of the interference pattern may, in some application be less desirable. Focusing the pattern onto an area greater than approximately 1 mm in diameter can be effective in some implementations. Tighter focusing can also be possible so long as destructive interference does not obscure the transmitted data.

An integrating camera, such as for example a charge-coupled device (CCD) type camera can be used to measure pulses of light containing zeptojoules (1 zeptojoule=$10^{-21}$ joules) or even smaller units of incident energy. This level of sensitivity can be achieved in some implementations using spectral interferometric techniques including, but not limited to, focusing as much light as possible through optical lenses onto a small recording plane that is just large enough to capture the interference pattern fringes without unduly increasing destructive interference.

As noted above, one approach to increase the robustness of an optical communication systems is to increase the power per pulse or duty cycle of the transmission source. For example, a pulsed laser can be operated at a lower pulse frequency with a greater power per pulse. This approach can improve the system connectivity in challenging atmospheric conditions, such as for example fog, rain, snow, smog, or other conditions characterized by a high concentrations of aerosol particles. However, in many laser systems, the power per pulse and pulse rate are inversely related. Thus, increasing the power per pulse generally lowers the pulse rate. If each pulse is encoded with an additional data, a reduced repetition rate can result in slower data transfer rates.

Among other possible advantages, the currently disclosed subject matter can improve the connectivity and data throughput that can be achieved for a given laser transmission power under a given set of transmission conditions. Transmission reliability at a given pulse or beam energy can be improved due to the integrated spectral interferometry signal as discussed above. As such, a more reliable transmission link may be established for a given laser pulse power without the need to lower the transmission rate.

Use of a small crossing angle at which the two or more beams or pulses intersect can in some implementations necessitate exact and steady alignments. Variations in the path length of one beam, such as can be caused by atmospheric scintillation effects, can alter the very sensitive alignments of the beams, thereby deflecting one or more of the beams off camera. Physical motion and vibrations pose additional challenges. Vibrations affecting the camera could cause the incident light to appear out of position, thereby blurring the very detailed interferometric pattern and potentially washing out the fringes which are decoded to extract transmitted data.

Techniques such as frequency resolved optical gating (FROG) have been developed to provide different approaches to splitting one beam into two, which is one approach to performing optical measurements. Various techniques have reduced the amount of components and the complexity of the alignment procedure. Mirrors, prisms, and fiber optics, such as for example the Fresnel bi-mirror and the Fresnel bi-prism have been employed to reduce the optics needed to split a single input beam into two parts. The exact method of splitting a beam as described in the present disclosure is a design choice.

In one implementation illustrated in FIG. 1, an optical transmission system 100 includes a transmitter unit 102 and a receiver unit 104. Both units in a communication system can have both transmission and receiving equipment to facilitate two-way communications. For clarity, the example shown in FIG. 1 includes only one transmitter unit 102 and one receiver unit 104. The transmitter unit 102 produces transmission light 106 that can be a laser pulse or beam, emission from an LED, or the like carrying optically encoded data that is directed to the receiver unit 104. The transmission light source can optionally be a pulsed laser or a continuous wave laser with external intensity removal. The transmission light 106 can travel to the receiver through an optical fiber, through an open "free space" gap, or through a combination thereof. In the receiver unit 104, the transmission light 106 is optically split, for example using one or more optical components 108. The split light 106A, 106B can be transmitted by fiber optics 110 or transmitted over an open free space path. The split light 106A, 106B can then be crossed to form an interference pattern that can be focused by a lens 112 onto a detector 114 that can record the interference spectrum for analysis to extract the transmitted data in the transmission light 106. The detector 114 can optionally be a recording camera, a CCD, or other means for detecting and quantifying the intensity of incident light as a function of location on an incident area. In general, a detector 114 has a light sensitive measurement area upon which the interference pattern can be focused or projected. The detector 114 can be coupled to a processor 116 that executes a decoding algorithm that reconstructs the optically encoded data from the interference pattern as discussed in greater detail below. The transmitter unit 102 can also include a transmitter processor 120 that receives data to be transmitted and encodes the transmitted data for transmission in the transmission light 106.

Figure 2:
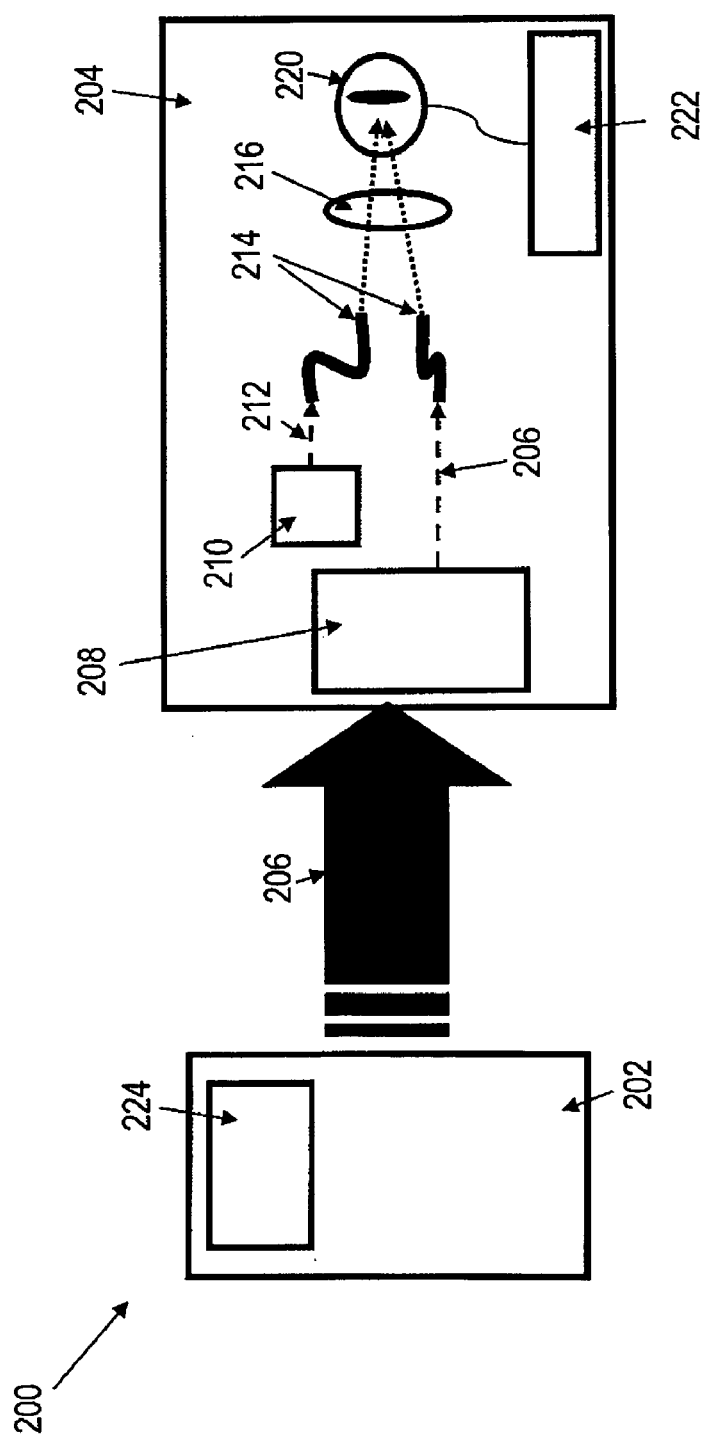
FIG. 2 is a diagram of a FSOC system in which an incident laser pulse is combined with a second laser pulse generated at the receiver unit to generate a spectral interference pattern.

An alternative implementation is shown in FIG. 2. This transmission system 200 includes a transmitter unit 202 and a receiver unit 204. The transmitter unit 202 produces transmission light (as described above) 206 carrying optically encoded data that is directed to the receiver unit 204. The transmission light 206 can travel to the receiver through an optical fiber, through an open "free space" gap, or through a combination thereof. The receiver unit 204 can include one or more receiving optical components 208 as well a mixing source 210 that generates mixing light in the form of pulses or a continuous width beam 212 that can be crossed with the transmission light 206 to form an interference pattern. The mixing light source 210 can be a laser, an LED, or the like. The transmission light 206 and the mixing light can optionally be directed over a free space gap or by fiber optics 214. The interference pattern can be focused by a lens 216 onto a detector 220 as described above in regards to FIG. 1. The mixing pulse or beam 214 produced by the mixing laser 212 has a wavelength that is within the operating range of the recording camera 220. The transmission light wavelength can optionally be outside the operating range of the recording camera 220. In one example, the mixing light 212 can have a wavelength in the visible or near visible spectrum while the transmission light 206 can have a wavelength in the infrared spectrum. In one example, the mixing light wavelength can be in a range of approximately 700 to 900 nm or alternatively approximately 800 while the transmission light wavelength can be in a range of approximately 1450 to 1650 nm or alternatively approximately 1550 nm. In some implementations, the detector 220 can be sensitive to visible light but insensitive to infrared light. The detector 220 can be coupled to a processor 222 that executes a decoding algorithm that reconstructs the optically encoded data from the interference pattern as discussed in greater detail below. The transmitter unit 202 can also include a transmitter processor 224 that receives data to be transmitted and encodes the transmitted data for transmission in the transmission light 206.

As noted above, an interference pattern can be produced whenever two coherent light sources interact. According to the current subject matter, it is only necessary for the detector to be able to detect and quantify light from one of the wavelengths being crossed to create an interference pattern for the detector to be able to capture all of the transmitted data provided in the interference pattern. The interference pattern is the same in all components of light involved. This property of interference patterns allows the use of a detector that could not normally detect light at a given wavelength, as disclosed above in regards to the example implementation shown in FIG. 2. It can in some cases be necessary, to account for the phase of the transmitted light, as it may undergo rotation during traversal of an air-filed space. In one example, this can be accomplished by a phase-locked system in which the incoming beam at a first transmission wavelength or frequency drives the mixing laser which is at a second mixing wavelength or frequency, which is detectable by the camera or CCD in question One advantage of this approach is that the beams containing data or signal from a remote source need not have enough intensity to be detected by a camera, only enough intensity to interfere with another coherent light source that can be detected by the receiver camera. As an additional advantage, use of a visible wavelength laser as part of the data carrier pulse or beam or as the mixing pulse or beam can facilitate the use of less expensive and more efficient cameras or light detection equipment. Currently available cameras in the visible range are generally cheaper and more sensitive than cameras that can detect infrared wavelengths such as for example 1550 nm.

Communications companies can in some cases prefer to use infrared wavelengths, particularly around 1550 nanometers for the transmission pulse or beam. At this wavelength, higher pulse powers may be used with a lesser risk of eye damage. Use of lasers or other light sources with wavelengths closer to the visible spectrum, such as for example 800 nm, can in general be restricted to more limited power outputs for this reason. Use of a visible wavelength camera, as described above, to detect the interference pattern of data transmitted in the infrared, has an immediate cost and performance benefit for any communications system.

The wavelength of the mixing beam generated at the receiver unit 204 can be of any frequency, and it can generated by a continuous wave or pulsed laser or other similar source, such as an LED. If the transmission light has a substantially different wavelength than the mixing light, it may be necessary for the mixing light source (for example a laser) to be pulsed. The pulse width necessary to produce a resolvable interference pattern depends on the difference between the transmission and the mixing light wavelengths. If, for example, the transmission light has a wavelength of 1550 nm and the mixing light has a wavelength of 800 nm, the pulse width of the mixing light can be on the order of nanoseconds. For a transmission wavelength of 8000 nm and a mixing wavelength of 800 nm, the pulse width of the mixing light source can be on the order of femtoseconds.

Figure 3:
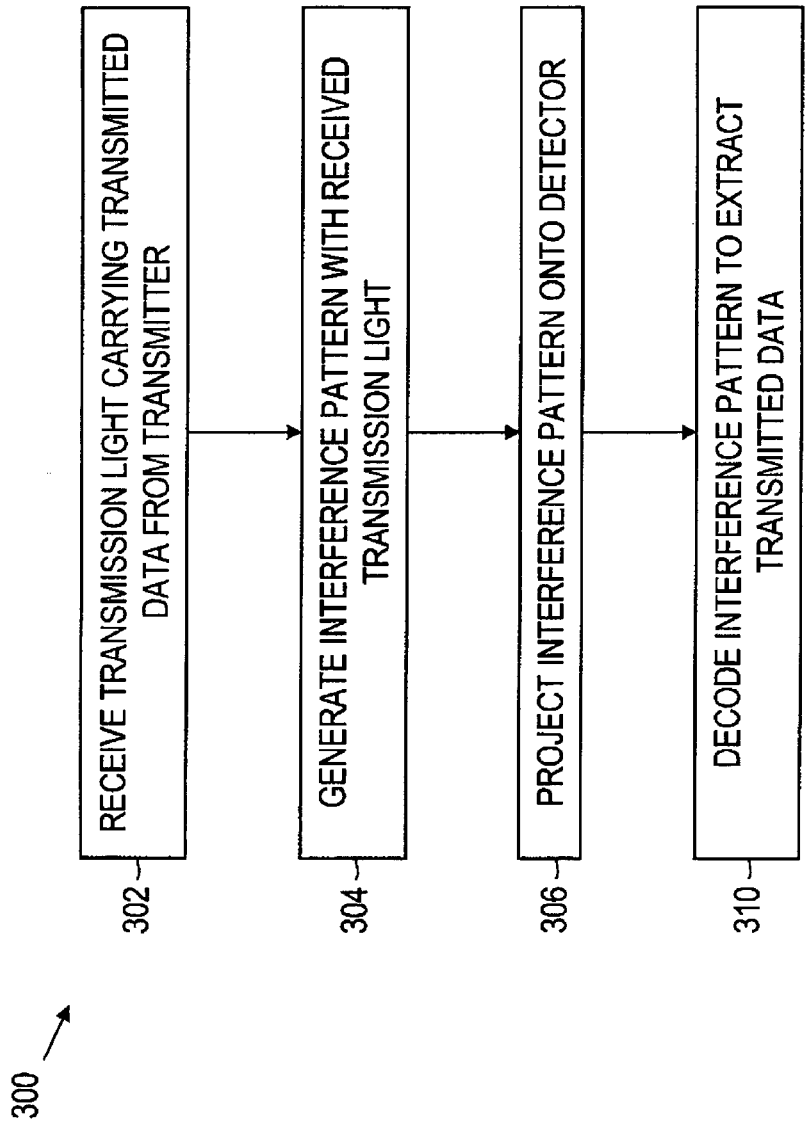
FIG. 3 is a process flow diagram illustrating an optical communications method using interferometry.

In further implementations of the disclosed subject matter, methods are provided for transmitting data optically. The process flow chart 300 of FIG. 3 shows one such method. Transmission light carrying optically encoded data is received at a receiver at 302. The transmission light can be a continuous wave or pulsed beam from a light source such as a laser, an LED, or the like. An interference pattern is generated using the transmission light at 304. Optional methods for creating the interference pattern are discussed in greater detail below. The interference pattern, which includes one or more constructive and destructive interference bands, is projected onto a detector at 306. The detector can be a camera lens, a CCD, or other means as described above for detecting and quantifying the intensity of incident light as a function of area on the incident area. The interference pattern can be analyzed to reconstruct the optically encoded data in the transmission beam at 310. Further explanation is provided below regarding an exemplary but non-limiting algorithm for reconstructing the optically encoded data.

Figure 4:
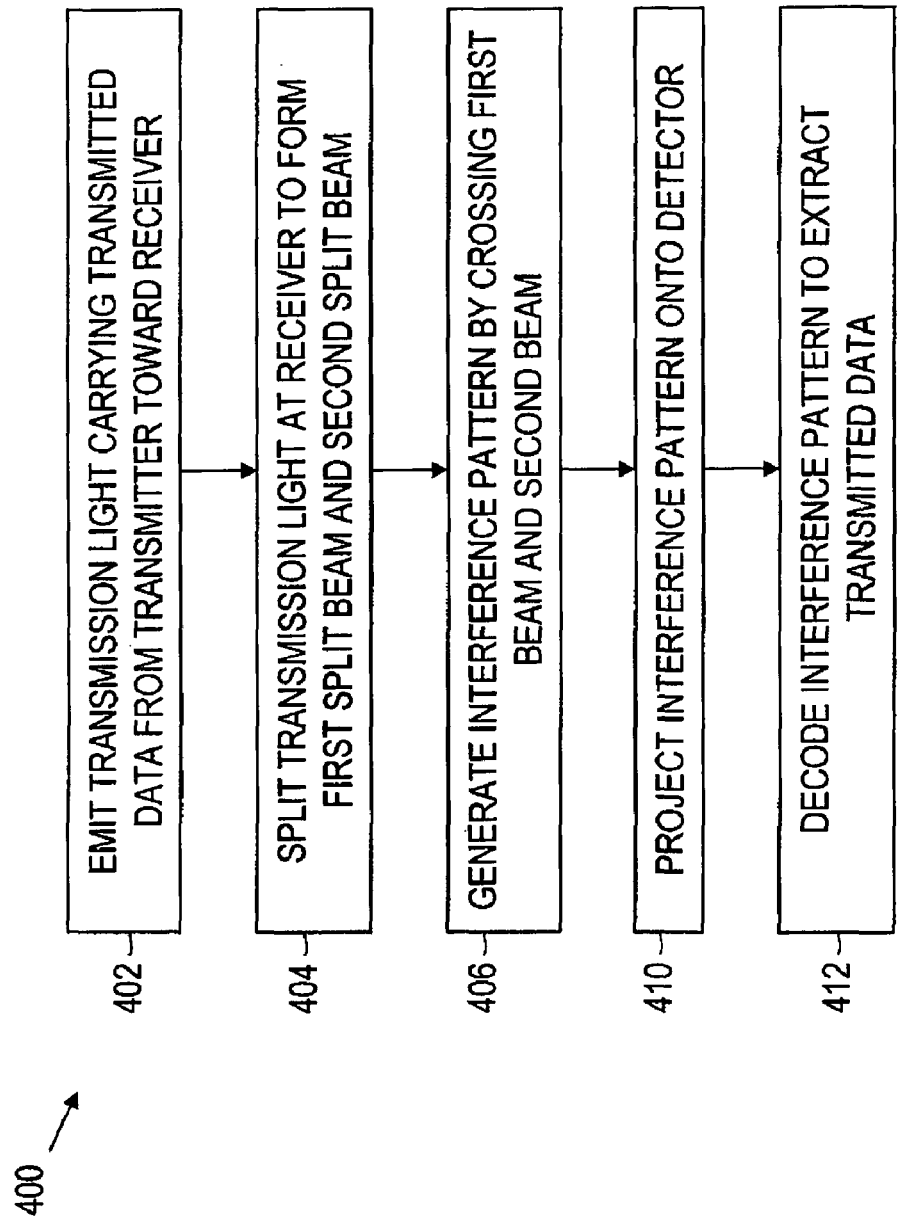
FIG. 4 is a process flow diagram illustrating a second optical communications method using interferometry.

In a second implementation, illustrated in the process flow chart 400 shown in FIG. 4, transmission light carrying optically encoded data can be emitted from a transmitter toward a receiver at 402. As noted above, the transmission light can be from a continuous wave or pulsed source, such as for example a laser or an LED or the like. The transmission light can be received at a receiver and split to form a first split beam and a second split beam at 404. The interference pattern that results from mixing the first and second split beams can be projected onto a detector at 410. The detector can be as described above. The interference pattern can then be decoded to reconstruct the optically encoded data carried in the transmission light at 412, for example as described below.

Figure 5:
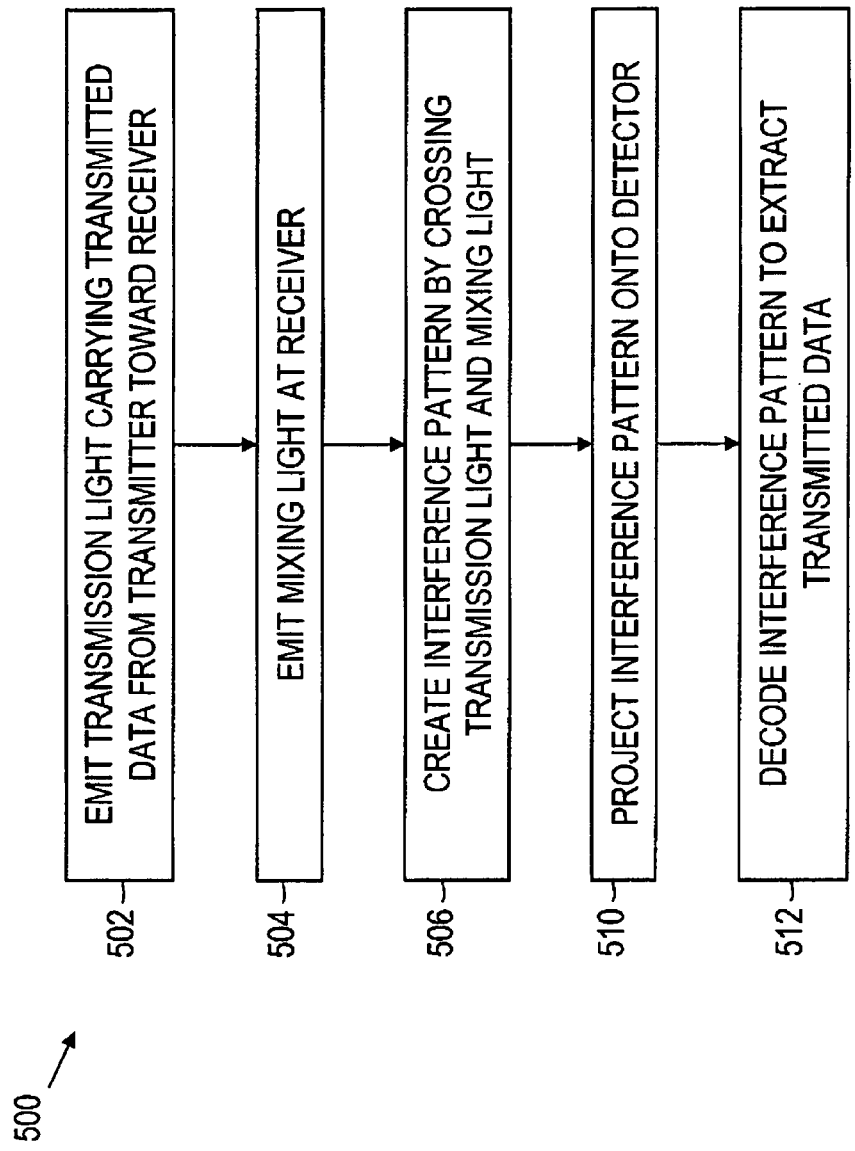
FIG. 5 is a process flow diagram illustrating an alternative optical communications method using interferometry.

In a third implementation, illustrated in the process flow chart 500 shown in FIG. 5, continuous wave or pulsed transmission light carrying optically encoded data can be emitted from a transmitter toward a receiver at 502. The receiver can generate mixing light from a mixing light source that may also be pulsed or continuous wave at 504. The transmission light and the mixing light can be mixed at 506, and the resultant interference pattern can be directed onto a detector at 510 such as is described above. The interference pattern can then be decoded to extract the optically encoded data carried in the transmission light at 512, for example as described below.

An algorithm can be used to de-code the transmitted information displayed in an interferometric pattern and captured on a detector that is coupled to a processor. Decoding is generally not necessary in classical systems because of the "on/off" property of light—it is sufficient to detect for any signal, and assume data arriving at a certain wavelength in a certain position in space is the correct data to be interpreting. The currently disclosed approach differs in that a decoder is required to understand the information properly. Each set of equipment will require different protocols, so some degree of customization of the basic data extraction algorithm may be necessary for each application.

Figure 6:
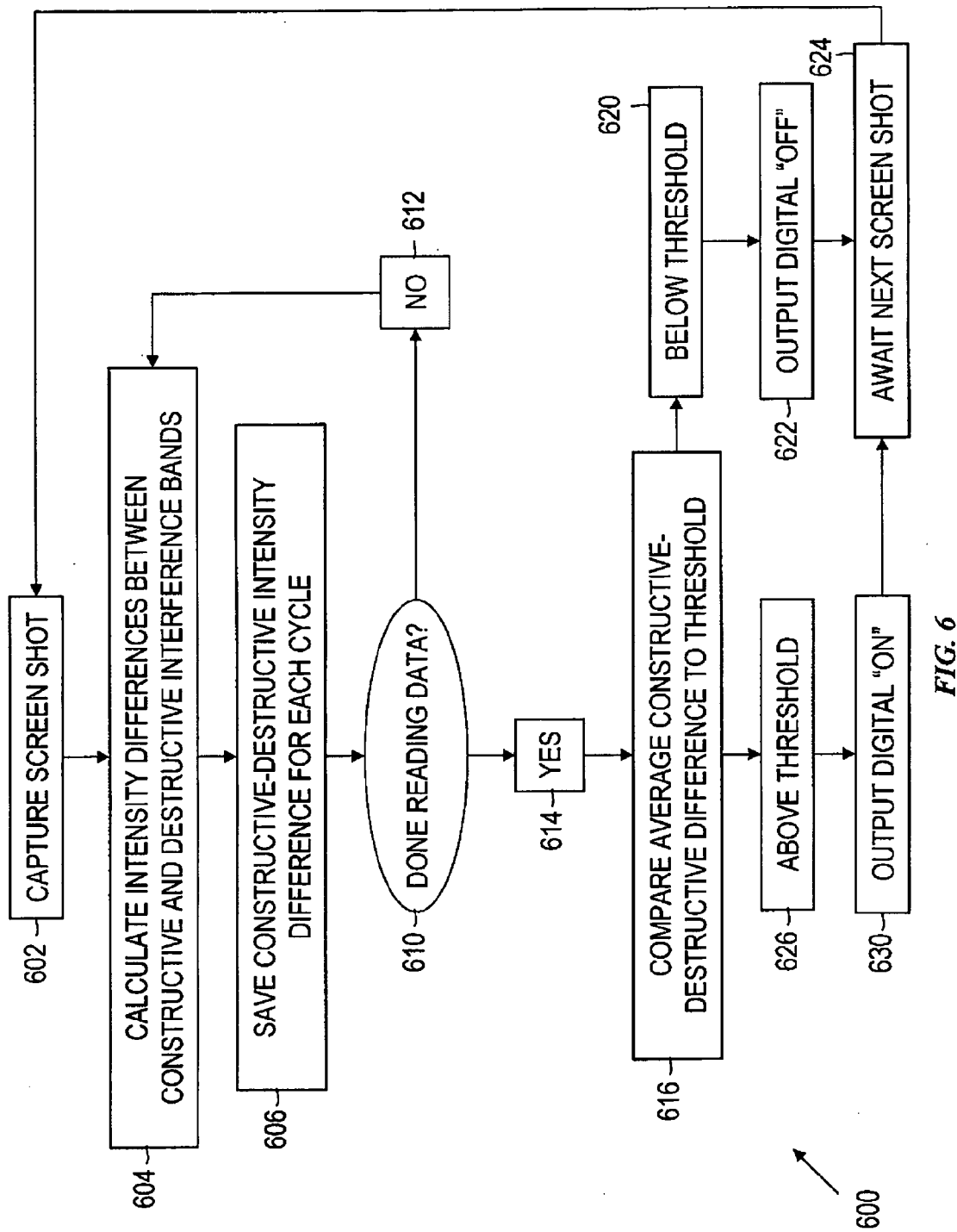
FIG. 6 is a process flow diagram illustrating a method of extracting transmitted data from an interference pattern.
Figure 7:
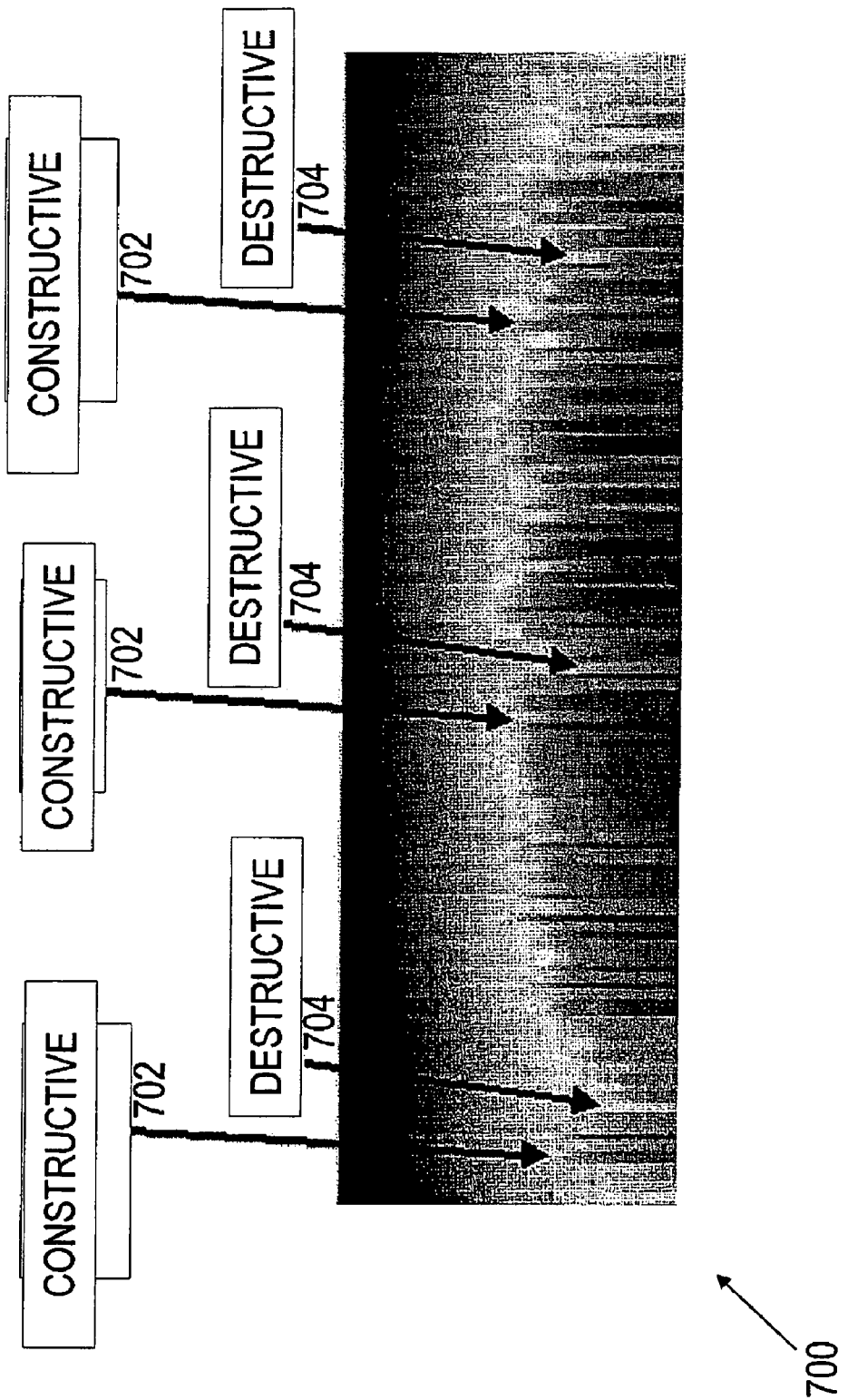
FIG. 7 is an example of a spectral interference pattern showing possible points at which data extraction and noise verification may be performed.

One example of an extraction method that may be used in the disclosed communications systems is illustrated in the process flow chart 600 of FIG. 6. To start, data from an detector device, such as those described above, can be read into a data processing unit, such as for example a microprocessor. This process can include, for example, capturing a screenshot from the detector at 602. The screenshot can be analyzed to calculate differences in intensity between the constructive interference (peak intensity) and destructive interference (low intensity) bands for each cycle in the interference pattern at 604. A cycle is a pair of peak intensity and low intensity bands resulting from a constructive interference and a destructive interference, respectively. The constructive to destructive intensity differences can be saved for each cycle at 606. In one example, the difference between the constructive and destructive parts of a cycle can be determined by taking the difference of the average the intensity observed over the constructive half of the cycle and the average intensity observed over the destructive half of the cycle. Identification of the width of a constructive-destructive cycle can be based, in some implementations, on the distance between neighboring constructive band positions of peak intensity or alternatively by averaging the width of a two or more of constructive-destructive cycles.

The algorithm then checks to verify whether the data have been completely read at 610. This verification can optionally be performed by verifying whether additional unread cycles are present in a captured screenshot. If additional unread cycles remain at 612, the differences between peak and low intensity bands of the next cycle in the interference pattern can be calculated at 604 and saved at 606. If the data have been read completely at 614, the average difference between peak and low intensity bands for all read cycles in the interference pattern can be examined at 616. If the average difference is determined to be less than a threshold value at 620, a digital zero (0) or "off" can be output and the algorithm can wait for the next screenshot at 624. If the average difference is determined to be greater than the threshold at 626, a digital one (1) or "on" can be output at 630 and the algorithm can wait for the next screenshot at 624.

The threshold can be set based on a number of factors, such as for example some value of non-uniform variation that is expected from the hardware. The number of cycles to count before ending data collection for a screenshot can, for example, be based on the resolution and/or sensitivity of the input device, for example the camera or CCD.

In addition to data extraction, noise sampling can be applied to each interference spectrum. In some implementations, a series of constructive and destructive bands in a trace can be compared with an "expected" spectrum to verify for the appropriate presence of light or lack thereof in expected positions on the camera or CCD receiver area. One or more sampling points or pairs of sampling points can be selected to filter out against noise. In an example of an interference pattern 600 shown in FIG. 6, six separate check points are sampled: three constructive (high intensity) bands 602 and three destructive (low intensity) bands 604.

While the disclosed examples describe a free space optical communication system, the transmission and reception technologies disclosed here may also be applied to any laser-based data communications system, such as for example a fiber optics network. The implementations set forth in the foregoing description do not represent all implementations consistent with the subject matter described herein. Instead, they are merely some examples consistent with aspects related to the described subject matter. Other aspects, advantages, and modifications are considered to be within the scope of the claims presented below. The claims presented are representative of the subject matter disclosed herein. Other, unclaimed aspects of the disclosed subject matter are also contemplated.

Wherever possible, the same reference numbers have been used throughout the drawings to refer to the same or like parts. Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flow depicted in the accompanying figures and/or described herein does not require the particular order shown, or sequential order, to achieve desirable results. Other embodiments may be within the scope of the following claims.

What is claimed:

1. A method comprising:
    receiving transmission light in a transmission beam from a transmitter at a receiver, the transmission beam carrying optically encoded data from the transmitter, the transmission light comprising a transmission wavelength in the infrared region of the electromagnetic spectrum;
    emitting mixing light in the receiver, the mixing light comprising a mixing wavelength in the visible or near-visible region of the electromagnetic spectrum;
    generating an interference pattern from the transmission light, the interference pattern comprising a spatial distribution of light intensities formed from at least one constructive interference band and at least one destructive interference band, the generating of the interference pattern comprising crossing the transmission light and the mixing light;
    projecting the interference pattern on a detector; and
    reconstructing the encoded data by analyzing the spatial distribution of light in the interference pattern and quantifying intensity differences between the at least one constructive interference band and the at least one destructive interference band.

2. A method as in claim 1, wherein the detector is sensitive to light with at least one of the mixing wavelength and the transmission wavelength.

3. A method as in claim 1, wherein the mixing light is emitted with a pulse width that depends on the difference between the transmission wavelength and the mixing wavelength.

4. A method as in claim 1, wherein the detector is sensitive only to the mixing wavelength.

5. A method as in claim 1, wherein the reconstructing comprises:
    capturing a screen shot from the detector; and
    returning a digital "on" if an average of the intensity differences exceeds a threshold value and a digital "off" if the average intensity does not exceed the threshold value.

6. A method as in claim 1, wherein the detector comprises a charge-coupled device or a recording camera.

7. A method as in claim 1, wherein the detector comprises a charge-coupled device or a recording camera.

8. A method comprising:
    receiving transmission light in a transmission beam from a transmitter at a receiver, the transmission beam carrying optically encoded data from the transmitter, the transmission light comprising a wavelength in a range of approximately 1450 to 1650 nm;
    emitting mixing light in the receiver, the mixing light comprising a mixing wavelength in a range of approximately 700 to 900 nm;
    generating an interference pattern from the transmission light, the interference pattern comprising a spatial distribution of light intensities formed from at least one constructive interference band and at least one destructive interference band, the generating of the interference pattern comprising crossing the transmission light and the mixing light;
    projecting the interference pattern on a detector; and
    reconstructing the encoded data by analyzing the spatial distribution of light in the interference pattern and quantifying intensity differences between the at least one constructive interference band and the at least one destructive interference band.

9. A method as in claim 8, wherein the mixing light has a mixing wavelength of approximately 800 nm and the transmission light has a wavelength of approximately 1550 nm.

10. A method as in claim 8, wherein the detector is sensitive to light with at least one of the mixing wavelength and the transmission wavelength.

11. A method as in claim 8, wherein the mixing light is emitted with a pulse width that depends on the difference between the transmission wavelength and the mixing wavelength.

12. A method as in claim 8, wherein the detector is sensitive only to the mixing wavelength.

13. A method as in claim 8, wherein the mixing light has a mixing wavelength of approximately 800 nm and the transmission light has a wavelength of approximately 1550 nm.

14. A method as in claim 8, wherein the reconstructing comprises:
    capturing a screen shot from the detector; and
    returning a digital "on" if an average of the intensity differences exceeds a threshold value and a digital "off" if the average intensity does not exceed the threshold value.

15. An apparatus comprising:
    means for receiving transmission light in a transmission beam from a transmitter at a receiver, the transmission beam carrying optically encoded data from the transmitter, the transmission light comprising a wavelength in the infrared region of the electromagnetic spectrum;
    means for emitting mixing light in the receiver, the mixing light comprising a mixing wavelength in the visible or near-visible region of the electromagnetic spectrum;
    means for generating an interference pattern from the transmission light, the interference pattern comprising a spatial distribution of light intensities formed from at least one constructive interference band and at least one destructive interference band, the generating of the interference pattern comprising crossing the transmission light and the mixing light;
    means for projecting the interference pattern on a detector; and means for reconstructing the encoded data by analyzing the spatial distribution of light in the interference pattern and quantifying intensity differences between the at least one constructive interference band and the at least one destructive interference band.

16. An apparatus as in claim 15, wherein the detector is sensitive to light with at least one of the mixing wavelength and the transmission wavelength.

17. An apparatus as in claim 15, wherein the mixing light is emitted with a pulse width that depends on the difference between the transmission wavelength and the mixing wavelength.

18. An apparatus as in claim 15, wherein the detector is sensitive only to the mixing wavelength.

19. An apparatus as in claim 15, wherein the means for reconstructing comprises:
- means for capturing a screen shot from the detector; and
- means for returning a digital "on" if an average of the intensity differences exceeds a threshold value and a digital "off" if the average intensity does not exceed the threshold value.

20. An apparatus as in claim 15, wherein the detector comprises a charge-coupled device or a recording camera.

* * * * *